United States Patent [19]
Naruse

[11] Patent Number: 6,115,410
[45] Date of Patent: Sep. 5, 2000

[54] WALSH CODE GENERATOR, SIGNAL TRANSMITTING APPARATUS AND SIGNAL RECEPTION APPARATUS

[75] Inventor: Tetsuya Naruse, Chiba, Japan

[73] Assignee: Sony Corporation, Tokyo, Japan

[21] Appl. No.: 08/666,224

[22] Filed: Jun. 20, 1996

[30] Foreign Application Priority Data

Jun. 30, 1995 [JP] Japan .................................... 7-166639

[51] Int. Cl.[7] .................................................. H04B 1/69
[52] U.S. Cl. ........................ 375/200; 370/209; 364/727
[58] Field of Search ................................... 375/200, 208; 370/209; 364/727

[56] References Cited

U.S. PATENT DOCUMENTS

| | | | |
|---|---|---|---|
| 3,618,077 | 11/1971 | Peterson | 364/727.01 |
| 3,795,864 | 3/1974 | Fullton, Jr. | 364/727.01 |
| 5,311,176 | 5/1994 | Gurney | 364/727.01 |
| 5,383,219 | 1/1995 | Wheatley, III et al. | 370/209 |
| 5,623,485 | 4/1997 | Bi | 375/208 |

*Primary Examiner*—Temesghen Ghebretinsae
*Attorney, Agent, or Firm*—Jay H. Maioli

[57] ABSTRACT

A Walsh code generator capable of performing signal processing at a high speed using the codewords of the Walsh code. A binary counter 3 generates a count signal counting upper (n-m) digits of a codeword number corresponding to a codeword of a Walsh code of plural bits. A parallel generation controller 4 generates, by the count signal and upper (n-m) bits of the codeword number, a parallel generation control signal for causing bits making up the codeword to be generated in parallel. A parallel Walsh code generator 5 generates the codeword in parallel by the parallel generation control signal and the lower m bits of the codeword number. The Walsh code generator may be reduced in the maximum operating frequency, while its power consumption may be lowered.

11 Claims, 7 Drawing Sheets

WALSH CODE GENERATOR, SIGNAL TRANSMITTING APPARATUS AND SIGNAL RECEPTION APPARATUS

BACKGROUND OF THE INVENTION

1. Field of the Invention

This invention relates to a Walsh code generator for generating codewords of the Walsh code, a signal transmission apparatus for transmitting signals modulated using the Walsh code generated by the Walsh code generator and a signal reception apparatus for receiving and demodulating transmission signals from the signal transmission apparatus.

2. Description of the Related Art

When transmitting data of plural channels in a sole frequency band, the conventional practice is to use divisional data multiplexing. Among known systems for doing such divisional data multiplexing, there are a frequency division multiplexing (FDM) system, a time divisional multiplexing (TDM) system, and a code divisional multiplexing (CDM) system.

With the CDM system, layered data each having a different data rate are weighted for allowing identification of respective layers and orthogonally transformed using a transform code spread in the same time-frequency space for demarcating respective channels. Error correction is carried out by convolution coding and punctured coding using variable encoding rates for respective channels for effecting layered transmission depending on data criticality. This CDM system enables easier layered transmission than other divisional multiplexing systems. In the field of mobile communication, call capacity can be enhanced as compared with that of other divisional multiplexing systems by combining the CDM system with the spread-spectrum system by direct spreading.

Thus, in the field of broadcasting, it has been envisaged to put this CDM system to practical utilization as a transmission system for digital video signals. In the field of mobile communication, this CDM system is used in the code divisional multiplexing connection system, or a so-called CDMA cellular telephone system, for demarcating each orthogonally coded channel into a control channel and a traffic channel.

As the orthogonal code of the CDM system, it is contemplated to use the Walsh code.

This Walsh code is a code in which an optional codeword is orthogonal to a codeword other than itself. With the Walsh code, the code may be found by expansion of the number of orders, with each row of the Hadamard matrix as a codeword. Specifically, with a Hadamard matrix H, a codeword may be found by expansion of the order number shown in Table 1:

TABLE 1

$$H_0 = [0]$$

$$H_1 = \begin{vmatrix} 0 & 0 \\ 0 & 1 \end{vmatrix}$$

$$H_2 = \begin{vmatrix} H_1 & H_1 \\ H_1 & \overline{H_1} \end{vmatrix} = \begin{vmatrix} 0 & 0 & 0 & 0 \\ 0 & 1 & 0 & 1 \\ 0 & 0 & 1 & 1 \\ 0 & 1 & 1 & 0 \end{vmatrix}$$

TABLE 1-continued

. . .
. . .

$$H_n = \begin{vmatrix} H_{n-1} & H_{n-1} \\ H_{n-1} & \overline{H_{n-1}} \end{vmatrix}$$

Thus the code W for N=3, for example, are as follows:

TABLE 2

$W_0$ = 00 00 00 00
$W_1$ = 01 01 01 01
$W_2$ = 00 11 00 11
$W_3$ = 01 10 01 10
$W_4$ = 00 00 11 11
$W_5$ = 01 01 10 10
$W_6$ = 00 11 11 00
$W_7$ = 01 10 10 01

Instead of by expanding the number of orders of the Hadamard matrix, the Walsh code may be found by the following method:

First, the codeword number in case a codeword W of the Walsh code is represented by the binary number and a binary count specifying the bit number in the codeword in binary representation are defined. If the codeword number and the binary count are represented by i and b, respectively, the codeword number i and the binary count b are represented by the following equations (1) and (2), respectively:

$$i = \{i_0, i_1, i_2\} \qquad (1)$$

$$b = \{b_0, b_1, b_2\} \qquad (2)$$

As for the codeword number i and the binary count b, the 0'th bit is the least significant bit (LSB) and the second bit is the most significant bit (MSB).

The bits of respective digits of the codeword $W_i$ are represented by the following equation (3):

$$W_i = \{W_{i0}, W_{i1}, W_{i2}, W_{i3}, W_{i4}, W_{i5}, W_{i6}, W_{i7}\} \qquad (3)$$

The bits of the respective digits of the codeword $W_i$ correspond to values obtained on Ex-ORing the result of product of the respective digits and may be represented by the following equation (4):

$$W_{ib} = i_0 \cdot b_0 \odot i_1 \cdot b_1 \odot i_2 \cdot b_2 \qquad (4)$$

where $\odot$ denotes Ex-OR.

That is, the bits of the respective digits may be represented by the equations of Table 3:

TABLE 3

$W_{i0} = i_0 \cdot 0 \odot i_1 \cdot 0 \odot i_2 \cdot 0$
$W_{i1} = i_0 \cdot 1 \odot i_1 \cdot 0 \odot i_2 \cdot 0$
$W_{i2} = i_0 \cdot 0 \odot i_1 \cdot 1 \odot i_2 \cdot 0$
$W_{i3} = i_0 \cdot 1 \odot i_1 \cdot 1 \odot i_2 \cdot 0$
$W_{i4} = i_0 \cdot 0 \odot i_1 \cdot 0 \odot i_2 \cdot 1$
$W_{i5} = i_0 \cdot 1 \odot i_1 \cdot 0 \odot i_2 \cdot 1$
$W_{i6} = i_0 \cdot 0 \odot i_1 \cdot 1 \odot i_2 \cdot 1$
$W_{i7} = i_0 \cdot 1 \odot i_1 \cdot 1 \odot i_2 \cdot 1$ For i=5, since i={1, 0, 1}, the codeword $W_5$ may be represented by the following equations shown in Table 4:

TABLE 4

$$W_{50} = 1 \cdot 0 \odot 0 \cdot 0 \odot 1 \cdot 0 = 0$$
$$W_{51} = 1 \cdot 1 \odot 0 \cdot 0 \odot 1 \cdot 0 = 1$$
$$W_{52} = 1 \cdot 0 \odot 0 \cdot 1 \odot 1 \cdot 0 = 0$$
$$W_{53} = 1 \cdot 1 \odot 0 \cdot 1 \odot 1 \cdot 0 = 1$$
$$W_{54} = 1 \cdot 0 \odot 0 \cdot 0 \odot 1 \cdot 1 = 1$$
$$W_{55} = 1 \cdot 1 \odot 0 \cdot 0 \odot 1 \cdot 1 = 0$$
$$W_{56} = 1 \cdot 0 \odot 0 \cdot 1 \odot 1 \cdot 1 = 1$$
$$W_{57} = 1 \cdot 1 \odot 0 \cdot 1 \odot 1 \cdot 1 = 0$$

Thus the codeword $W_5$ may be found from the following equation (5):

$$W_5 = \{W_{50}, W_{51}, W_{52}, W_{53}, W_{54}, W_{55}, W_{56}, W_{57}\} \qquad (5)$$
$$= \{0, 1, 0, 1, 1, 0, 1, 0\}$$

Figure 1:
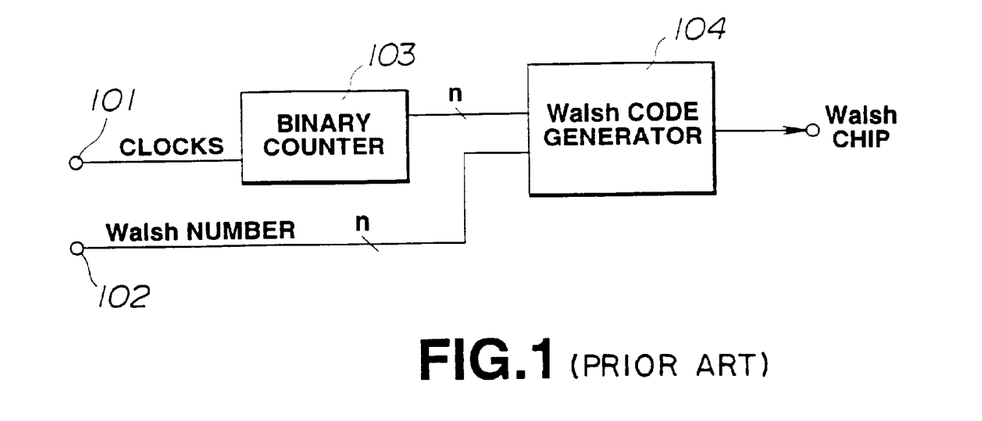
FIG. 1 illustrates a schematic structure of a conventional Walsh code generator.

Referring to FIG. 1, Walsh code generator for generating a codeword of the Walsh code is explained.

Clock signals are supplied to a signal input terminal 101 and thence supplied to a n-bit binary counter 103. These clock signals are of an operating frequency corresponding to the bit rate of the codeword to be outputted. The binary counter 103 is controlled on the basis of these clock signals. An n-bit count signal is outputted by this binary counter 103 and supplied to a Walsh code generator 104.

On the other hand, a codeword number of the Walsh code, that is, a Walsh number, is supplied from a signal input terminal 102, and supplied to a Walsh code generator 104. Using the n-bit count signal and the n-bit signal representing the Walsh number, the Walsh code generator 104 serially output s the codeword of the Walsh code bit-by-bit. The Walsh code bit, thus outputted, is termed a Walsh c hip .

Figure 2:
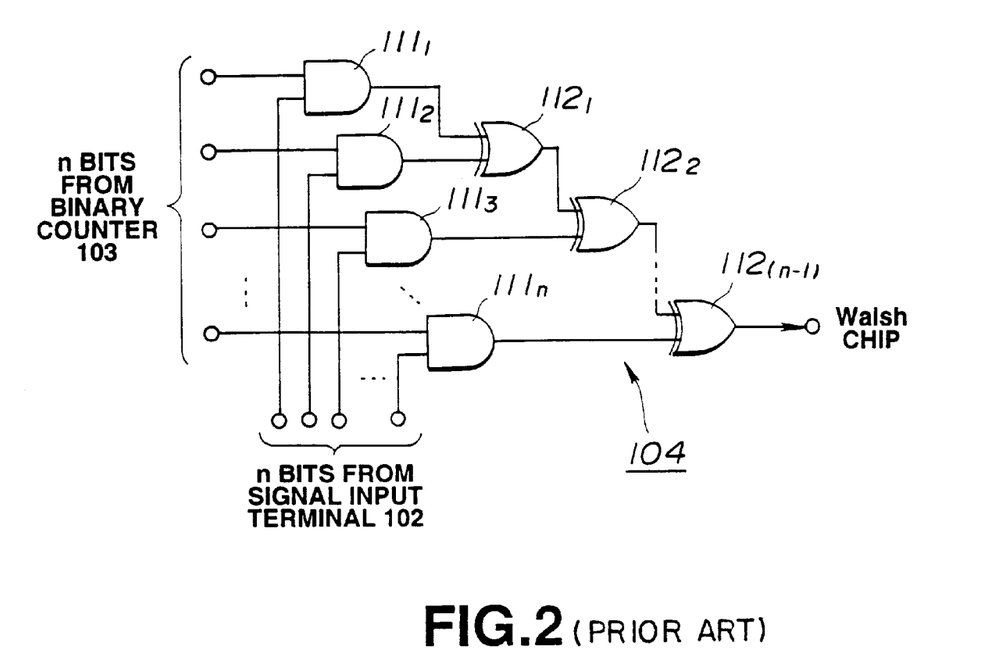
FIG. 2 illustrates a schematic structure of a conventional Walsh code generating portion.

An illustrative structure of the Walsh code generator 104 is shown in FIG. 2, in which the n-bit count signal entering the Walsh code generator 104 and the n-bit signal representing the Walsh number are sent to AND gates $111_1$ to $111_n$) bit-by-bit, beginning from the LSB side bit. These AND gates $111_1$ to $111_n$ take the products of the count signal and the signal representing the Walsh number and output the resulting products. All product outputs of the respective binary digits are Ex-ORed by Ex-OR gates $112_1$ to $112_{n-1}$ and the results of Ex-OR operations are outputted bit-by-bit as bits making up the codeword of the Walsh code. This output represents the Walsh chip.

Meanwhile, the above-described Walsh code generator serially outputs bits making up a codeword of the Walsh code bit-by-bit. Thus the binary counter 103 controlling the codeword bit of the Walsh code to be outputted needs to be operated at a high speed corresponding to the required speed times the number of bits making up the codeword of the Walsh code. Thus, in mobile communication in which signal modulation is by using the codeword of the Walsh code generated by the above-described Walsh code generator, such as a portable terminal, it is difficult to reduce the operating frequency.

SUMMARY OF THE INVENTION

It is therefore an object of the present invention to provide a Walsh code generator capable of generating the codeword of the Walsh code with a reduced operating frequency, a signal transmitting apparatus for transmitting signals modulated using the Walsh code generated by the Walsh code generator, and a signal reception apparatus for receiving and demodulating the signal transmitted from the signal transmitting apparatus.

The present invention provides a Walsh code generating apparatus, in which a parallel generation control signal for generating bits of a codeword of a Walsh code of plural digits in parallel is generated by upper bits of a codeword number corresponding to the codeword and a count signal from a counter counting upper digits of the codeword number. The codeword is generated in parallel by the parallel generation control signal and the lower order digits of the codeword number for outputting the bits making up the codeword of the Walsh code in parallel. Thus, if the counter is operated with the same operating frequency as that with the conventional device, the outputting time of a codeword may be diminished, thereby enabling high-speed signal processing employing the codeword of the Walsh code. On the other hand, if the speed of employing the codeword of the Walsh code is fixed, the operating frequency of the counter may be diminished, so that the maximum operating frequency of the Walsh code generator in its entirety may be diminished for lowering the power consumption.

The present invention also provides a signal transmission apparatus in which a modulated signal from modulation means is multiplied with a codeword of the Walsh code generated in parallel, in which spectrum spreading is carried out using the pseudo noise code generated in parallel to generate the PN code and the codeword of the Walsh code in parallel and in which the PN code and the codeword of the Walsh generator thus generated are used, thus assuring high-speed signal processing. If the speed of using the codeword of the Walsh code is fixed, the maximum operating frequency of the circuit generating the codeword of the Walsh code may be diminished for lowering the power consumption.

The present invention also provides a signal reception apparatus in which the reception signal is inverse spectrum-spread using the pseudo-noise code generated in parallel, and in which the codeword of the Walsh code and the PN code generated in parallel is used by multiplying the inverse spectrum-spread signal with the codeword of the Walsh code generated in parallel, thus assuring high-speed signal processing. If the speed of using the codeword of the Walsh code is fixed, the maximum operating frequency of the circuit generating the codeword of the Walsh code may be diminished for lowering the power consumption.

DESCRIPTION OF THE PREFERRED EMBODIMENTS

Figure 3:
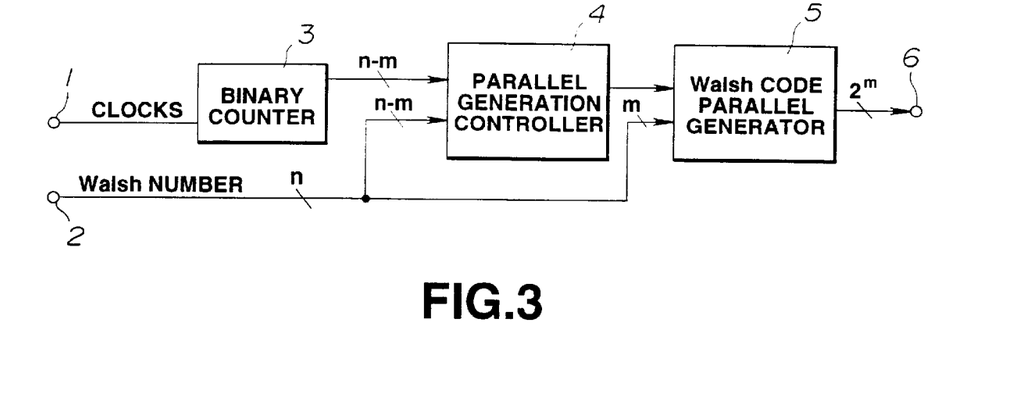
FIG. 3 illustrates a schematic structure of a Walsh code generator according to the present invention.

Referring to the drawings, preferred embodiments of the present invention will be explained in detail. FIG. 3 shows a schematic structure of a Walsh code generator according to the present invention.

The Walsh code generator includes a binary counter 3 for generating count signals counting upper binary digits of a codeword number corresponding to a codeword of the Walsh code of plural binary digits, and a parallel generation controller 4 for generating a parallel generation control signal for generating bits making up the codeword in parallel by a count signal from the binary counter 3 and upper order binary digits of the codeword number. The Walsh code generator also includes a parallel Walsh code generating portion 5 for parallel generation of the above codeword by the parallel generation control signal from the parallel generation controller 4 and the lower order binary digits of the codeword number.

The clock signals entering an input terminal 1 of FIG. 3 is sent to a binary counter 3. The clock signals are of an operating frequency corresponding to a bit rate of n bits representing the codeword of the n-binary digit Walsh code to be outputted. The binary counter 3 is controlled on the basis of the above clock signals. To a signal input terminal 2 is supplied a signal representing the codeword number of the n-bit Walsh code corresponding to the codeword of the n-binary digit Walsh code, or the so-called Walsh number. Upper (n-m) bits and lower m bits of the signal representing the n-bit Walsh number are sent to the parallel generation controller 4 and to the parallel Walsh code generator 5, respectively.

The binary counter 3 is responsive to one clock of the clock signals entering the signal input terminal 1 to output an (n-m) bit count signal for counting upper (n-m) binary digits of the codeword of the Walsh code. This count signal is used for controlling the position of an output bit of the plural bits making up the codeword of the Walsh code. This count signal is supplied to the parallel generation controller 4.

The parallel generation controller 4 controls upper (n-m) binary digits of the codeword of the n-bit Walsh code. Specifically, the parallel generation control signal for controlling the parallel Walsh code generator 5 is generated from the (n-m) bit counter signal from the binary counter 3 and the signal representing the upper (n-m) bits of the Walsh number and is outputted to the parallel Walsh code generator 5.

The parallel Walsh code generator 5 generates the codeword of the Walsh code from the parallel generation control signal and the signal representing the lower m bits of the Walsh code and outputs the generated codeword in parallel every $2^m$ bits at a signal output terminal 6. The Walsh code bits, generated every $2^m$ bits, are termed a Walsh chip.

Figure 4:
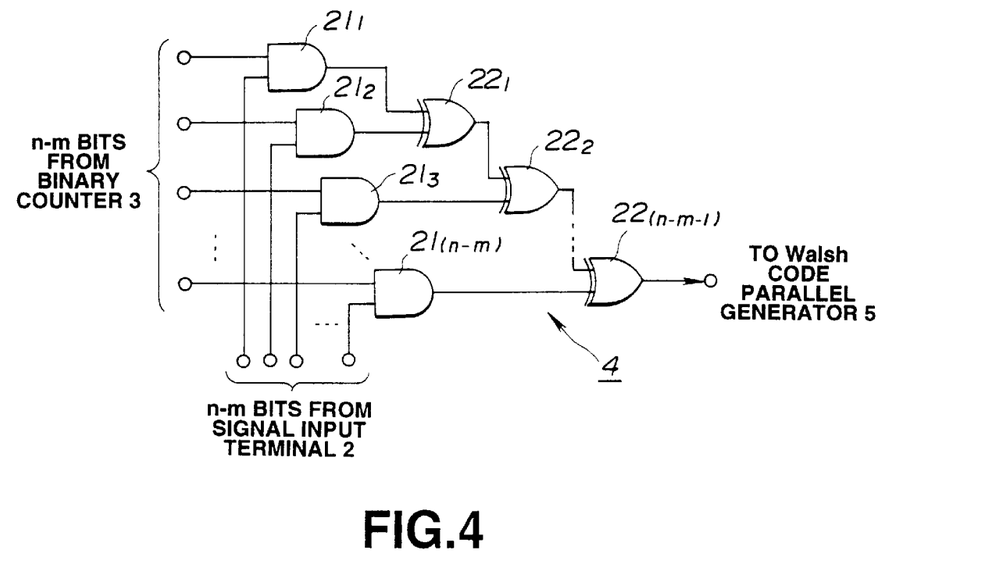
FIG. 4 illustrates a schematic structure of a parallel generation controller.

FIG. 4 shows a schematic structure of the parallel generation controller 4.

To AND gates $21_1$ to $21_{(n-m)}$ of the parallel generation controller 4 of FIG. 4 are supplied, bit-by-bit, a (n-m) bit count signal from the binary counter 3 and a (n-m) bit signal representing the Walsh number from the signal input terminal 2, in order to find the products of respective binary digits of the codeword of the Walsh code. All product outputs of these AND gates $2_1$ to $21_{(n-m)}$ are supplied to Ex-OR gates up to $22_1$ $22_{(n-m-1)}$ order to find and exclusive logical sum (ExOR).

Specifically, an output of the AND gate $21_1$ and an output of the AND gate $21_2$ are Ex-ORed by the Ex-OR gate $21_1$. Then, an output of the Ex-OR gate $22_1$ and an output of the AND gate $21_3$ are Ex-ORed by the Ex-OR gate $22_2$. Similarly, exclusive logical sums are sequentially found by the Ex-OR gates up to the Ex-OR gate $21_{(n-m-1)}$ in order to find exclusive logical sums of all product outputs of the AND gates $21_1$ to $21_{(n-m)}$. From the Ex-OR gate $22_{(n-m-1)}$, one-bit parallel control signal is outputted and supplied to the parallel Walsh code generator 5.

Figure 5:
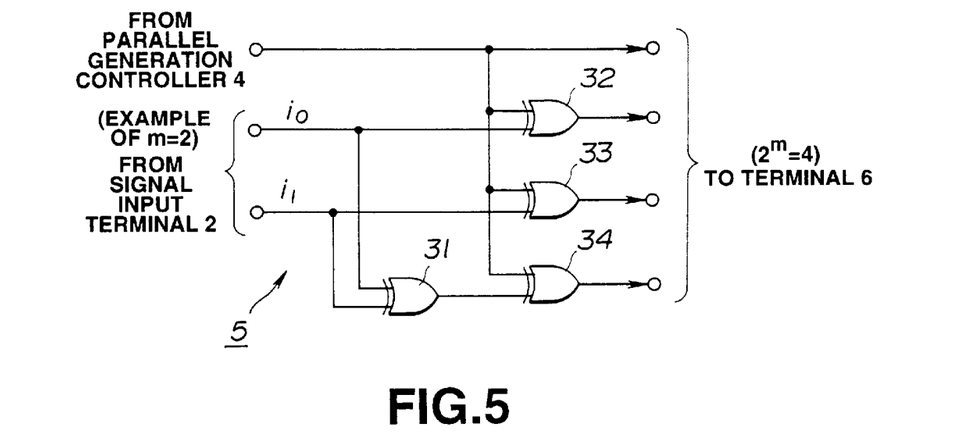
FIG. 5 illustrates a schematic structure of a parallel Walsh code generating portion.

FIG. 5 shows a schematic structure of the parallel Walsh code generator 5.

The generic method for arraying the codeword of the Walsh code in parallel every $2^m$ bits using the lower m bits for the Walsh number corresponding to this codeword is explained.

First, a $2^m$ sets of combinations of the lower m bits of the codeword of the Walsh number are generated. The combinations of the $2^m$ sets are shown in Table 5:

TABLE 5

First Set (-, -, . . . , -, -)
Second Set ($i_0$, -, . . . , -, -)
Third Set (-, $i_1$, . . . , -, -)
.
.
.
$2^m$th Set ($i_0$, $i_1$, . . . , $i_{m-2}$, $i_{m-1}$)

Then, exclusive logical sums of respective bits of all sets shown in Table 5 are found. The values of the respective sets are shown in Table 6.

TABLE 6

| | |
|---|---|
| First Set | 0 |
| Second Set | $i_0 = i_0$ |
| Third Set | $i_1 = i_1$ |
| . | |
| . | |
| . | |
| $2^m$th Set | ($i_0 \odot i_1 \odot \ldots \odot i_{m-2} \odot i_{m-1}$) |

By further finding exclusive logical sums of the parallel generation control signal and each set, the codeword of the Walsh code can be arrayed every $2^m$ bits in parallel to output the resulting parallel signal.

Specifically, the parallel Walsh code generator 5 shown in FIG. 5 shows a structure in which lower m bits of a signal representing the n bit Walsh number from the signal input terminal 2 are entered, where m is 2. Thus the parallel Walsh code generator 5 outputs a codeword of the Walsh code arrayed in parallel every 4 (=$2^2$) bits.

If the lowermost bit and the second lowermost bit of the signal representing the Walsh number entering the parallel Walsh code generator 5 are $i_0$ and $i_1$, respectively, the combinations of these two bits ($i_0$ and $i_1$) are four sets, as shown in Table 7:

TABLE 7

First Set (-, -)
Second Set ($i_0$, -)
Third Set (-, $i_1$)
Fourth Set ($i_0$, $i_1$)

An Ex-OR gate 31 finds the exclusive logical sum for each of the above four combinations. The results of Ex-OR operations for the respective sets are shown in Table 8:

TABLE 8

| | |
|---|---|
| First Set | 0 |
| Second Set | $i_0 = i_1$ |
| Third Set | $i_1 = i_1$ |
| Fourth Set | $i_0 \odot i_1$ |

The 1-bit parallel control signal entering the parallel Walsh code generator 5 is directly outputted to an external circuitry, while being supplied to Ex-OR gates 32, 33 and 34. The bits $i_0$ and $i_1$ are supplied to the Ex-OR gates 32, 33, respectively. Thus the parallel generation control signal is Ex-ORed with the bit $i_0$ by the Ex-OR gate 32, while the parallel generation control signal is Ex-ORed with the bit $i_1$ by the Ex-OR gate 33. In addition, the parallel generation control signal is Ex-ORed with an output of the Ex-OR gate 31 designed to find the exclusive logical sum of the bits $i_0$ and $i_1$. In this manner, a Walsh chip in which the n-bit codeword of the Walsh code has been arrayed in parallel every four bits is outputted.

Figure 6:
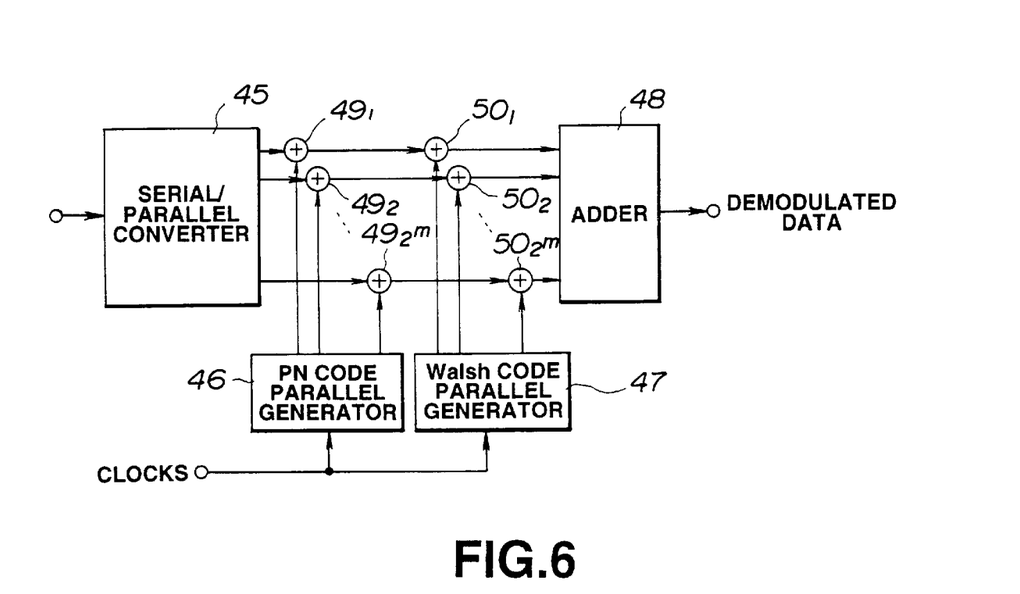
FIG. 6 schematically illustrates a signal demodulating device.

The digital signal, modulated by the codeword of the Walsh code, generated in parallel by the above-described structure of the Walsh code generator and spectrum-spread by the PN series, is demodulated by a signal demodulating apparatus shown in FIG. 6.

The digital signal, serially supplied to the signal demodulating device, is sent to a serial/parallel converter 45, which then outputs the digital signal arrayed in parallel every $2^m$ bits in association with the arraying of the codeword of the Walsh code in parallel. The signal thus arrayed in parallel every $2^m$ bits is sent bit-by-bit to adders $49_1$ to $49_{2m}$.

Also, clock signals are supplied to a parallel PN code generator 46 and a parallel Walsh code generator 47. The parallel PN code generator 46 then outputs the PN series every $2^m$ bits based on the clock signals, while the parallel Walsh code generator 47 outputs bits constituting the codeword of the Walsh code, every $2^m$ bits, based on the clock signals. The respective bits outputted by the parallel PN code generator 46 are sent to adders $49_1$ to $49_{2m}$, while the respective bits outputted by the parallel Walsh code generator 47 are sent to adders $50_1$ to $50_{2m}$, respectively.

The adders $49_1$ to $49_{2m}$ sum the respective bits of the digital signal from the serial/parallel converter 45 to PN series bits in order to find the exclusive logical sums. Outputs of these adders $49_1$ to $49_{2m}$ are sent to the adders $50_1$ to $50_{2m}$, respectively. The adders $50_1$ to $50_{2m}$ sum the respective bits of the adders $49_1$ to $49_{2m}$ to respective bits from the parallel Walsh code generator 47. Outputs of these adders $49_1$ to $49_{2m}$, are sent to the adder 48.

The adder 48 finds the sum of the respective bits of the $2^m$ bits to output demodulated data. This demodulates the digital signal modulated using the codeword of the Walsh code arrayed in parallel every $2^m$ bits.

Figure 7:
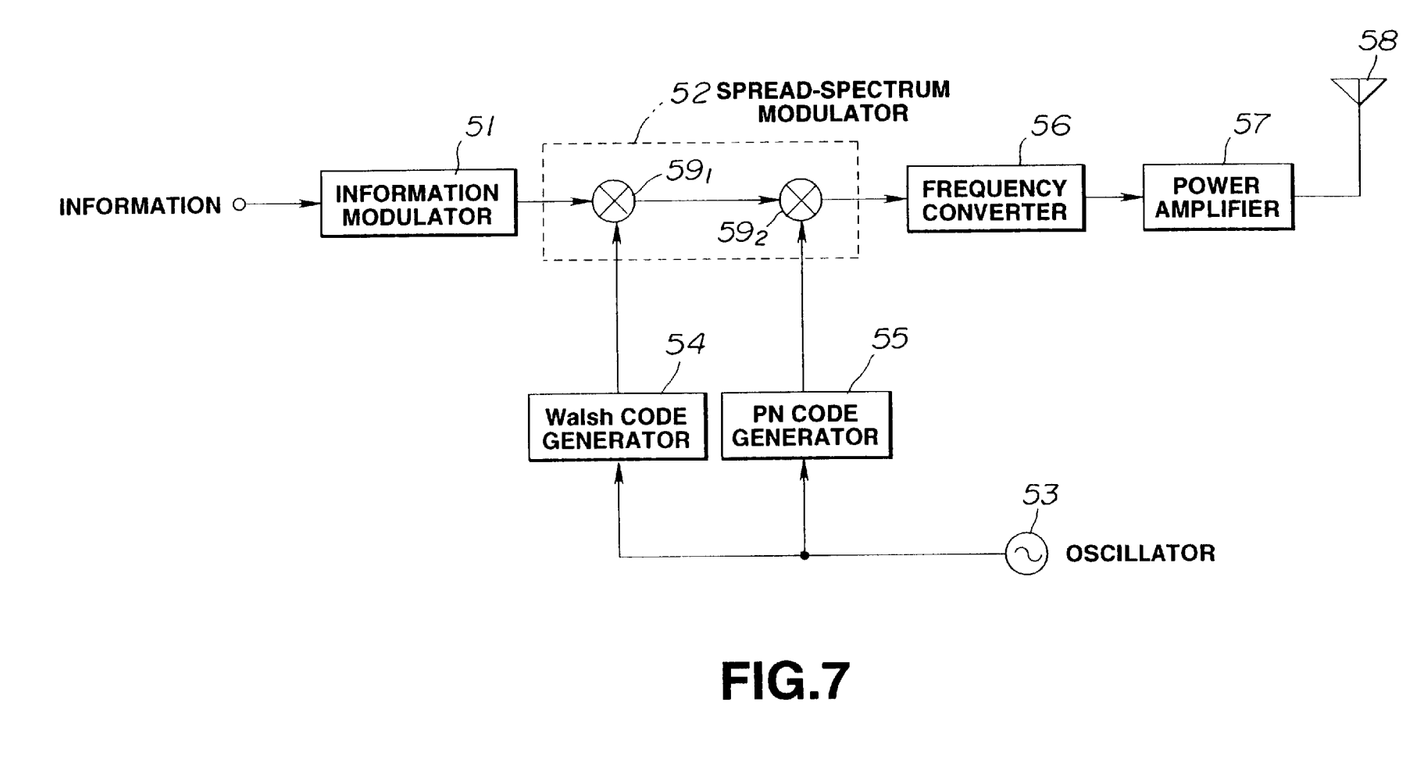
FIG. 7 schematically illustrates a signal transmitting apparatus according to the present invention.
Figure 8:
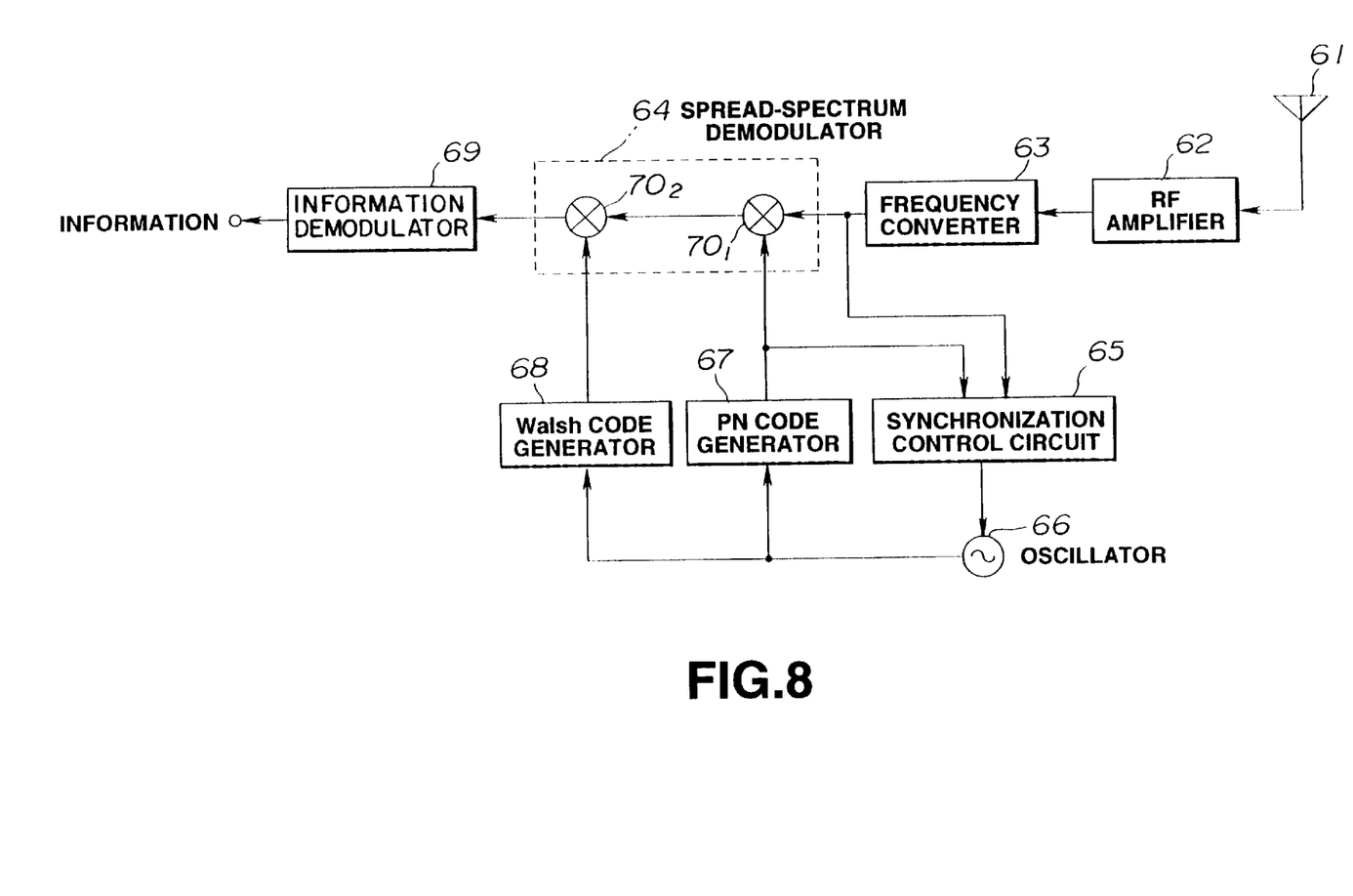
FIG. 8 schematically illustrates a signal receiving apparatus according to the present invention.

The schematic structure of a signal transmitting apparatus, configured for transmitting a signal demodulated using the codeword of the Walsh code generated in parallel by the structure of the above-described Walsh code generator is schematically shown in FIG. 7. The schematic structure of a signal reception apparatus configured for receiving and demodulating the signal transmitted by the signal transmission apparatus is shown in FIG. 8.

The signal transmitting apparatus shown in FIG. 7 includes an information conversion unit 51, for modulating the transmitted signal, and a Walsh code multiplication unit, made up of a Walsh code generator 54 and a multiplier $59_1$, for multiplying the modulated signal from the information conversion unit 51 with the codeword of the Walsh code generated in parallel. The signal transmitting apparatus also includes spectrum spreading means, made up of a PN code generator 55 and a multiplier $59_2$, for spectrum-spreading the output signal of the multiplier $59_1$ using the pseudo noise code generated in parallel.

The analog information signal or the digital signal grouped in plural bits as units, entering the signal transmission apparatus of FIG. 7, is sent to the information modulation unit 51, which then modulates the input information signals. The modulated information signals are sent to a spread-spectrum modulation unit 52 made up of multipliers $59_1$, $59_2$. The information signals from the information modulation unit 51 are sent to the multiplier $59_1$.

Meanwhile, clock signals are generated by an oscillator 53 and sent to the Walsh code generator 54 and the PN code generator 55. From the Walsh code generator 54, codewords of the Walsh code are generated in parallel every $2^m$ bits, based on the clock signals, so as to be sent to the multiplier $59_1$, whereas, from the PN code generator 55, the PN codes of the PN series are generated in parallel every $2^m$ bits based on the clock signals so as to be sent to the multiplier $59_2$.

The multiplier $59_1$ multiplies the information signal with the codeword of the Walsh code. This enables signal channel separation. An output of the multiplier $59_1$ is sent to the multiplier $59_2$ which then multiplies the output of the multiplier $59_1$ with the PN code for spread-spectrum processing.

An output of the multiplier $59_2$ is sent to a frequency converter 56. If the output is an analog signal, it is directly up-converted by the frequency converter 56 to a desired RF frequency, whereas, if the output is a digital signal, it is converted into analog signals and subsequently up-converted to the desired RF frequency. The frequency-converted signal is amplified by a power amplifier 57 so as to be transmitted over a transmission antenna 58.

The signal transmitted by the signal transmitting signal is received by the signal reception apparatus shown in FIG. 8.

The signal reception apparatus includes inverse spectrum-spreading means, made up of a PN code generator 67 and a multiplier $70_1$, for inverse spectrum-spreading the reception signal using the pseudo noise code generated in parallel, and Walsh code multiplication means, made up of a Walsh code generator 68 and a multiplier $70_2$, for multiplying an output signal of the multiplier $70_1$ with the codewords of the Walsh code generated in parallel. The signal reception apparatus also includes demodulation means, comprised of an information demodulator 69, for demodulating a output signal of the multiplier $70_2$.

The signal received by the reception antenna 61 of FIG. 8 is amplified by an RF amplifier 62 and down-converted from the RF signal to a baseband signal by a frequency converter 63. The down-converted signal may be subsequently converted into a digital signal. An output signal of the frequency converter 63 is sent to a spread-spectrum demodulator 64, made up of multipliers $70_1$, $70_2$, and a synchronization control circuit 65.

The synchronization control circuit 65 detects the synchronization signal of the reception signal and sends the detected signal to an oscillator 66 which generates clock signals based on the detected synchronization signal. These clock signals are sent to the PN code generator 67 and the Walsh code generator 68. From the PN code generator 67, the PN codes of the PN series are generated in parallel every $2^m$ bits, based on the clock signals, so as to be sent to the multiplier $70_1$. From the Walsh code generator 68, the codewords of the Walsh code are generated in parallel every $2^m$ bits, based on the clock signals, so as to be sent to the multiplier $70_2$. The PN code from the PN code generator 67 is sent to the synchronization control circuit 65 for synchronization.

In the multiplier $70_1$, an output signal of the frequency converter 63 is multiplied with the PN code to effect inverse spectrum spreading. An output of the multiplier $70_1$ is sent to the multiplier $70_2$ where an output of the multiplier $70_1$ is multiplied with the Walsh code for channel separation of the reception signal. An output of the multiplier $70_2$ is sent to the information demodulator 69 for demodulation before being outputted as information.

Figure 9:
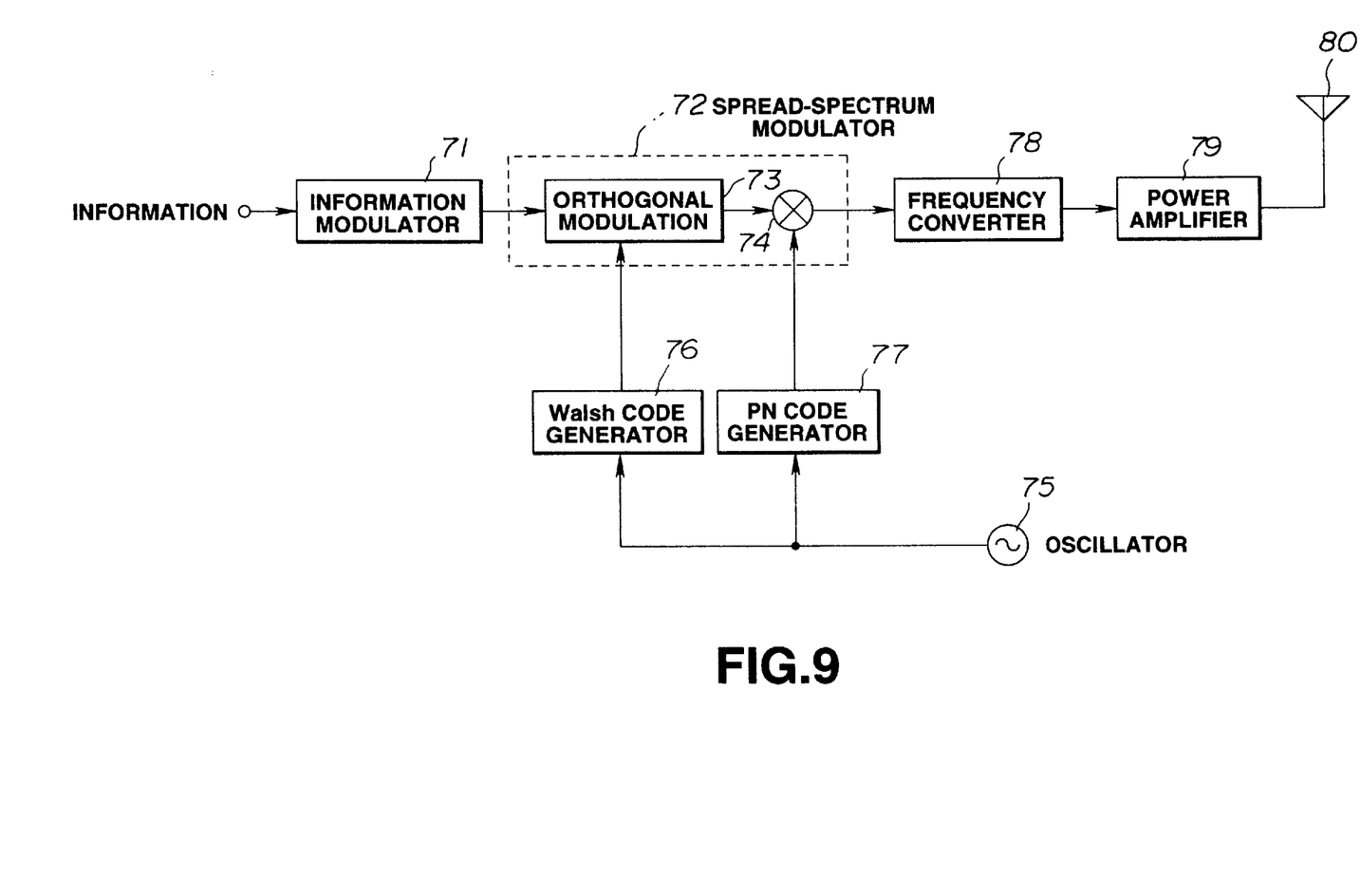
FIG. 9 schematically illustrates another signal transmitting apparatus according to the present invention.
Figure 10:
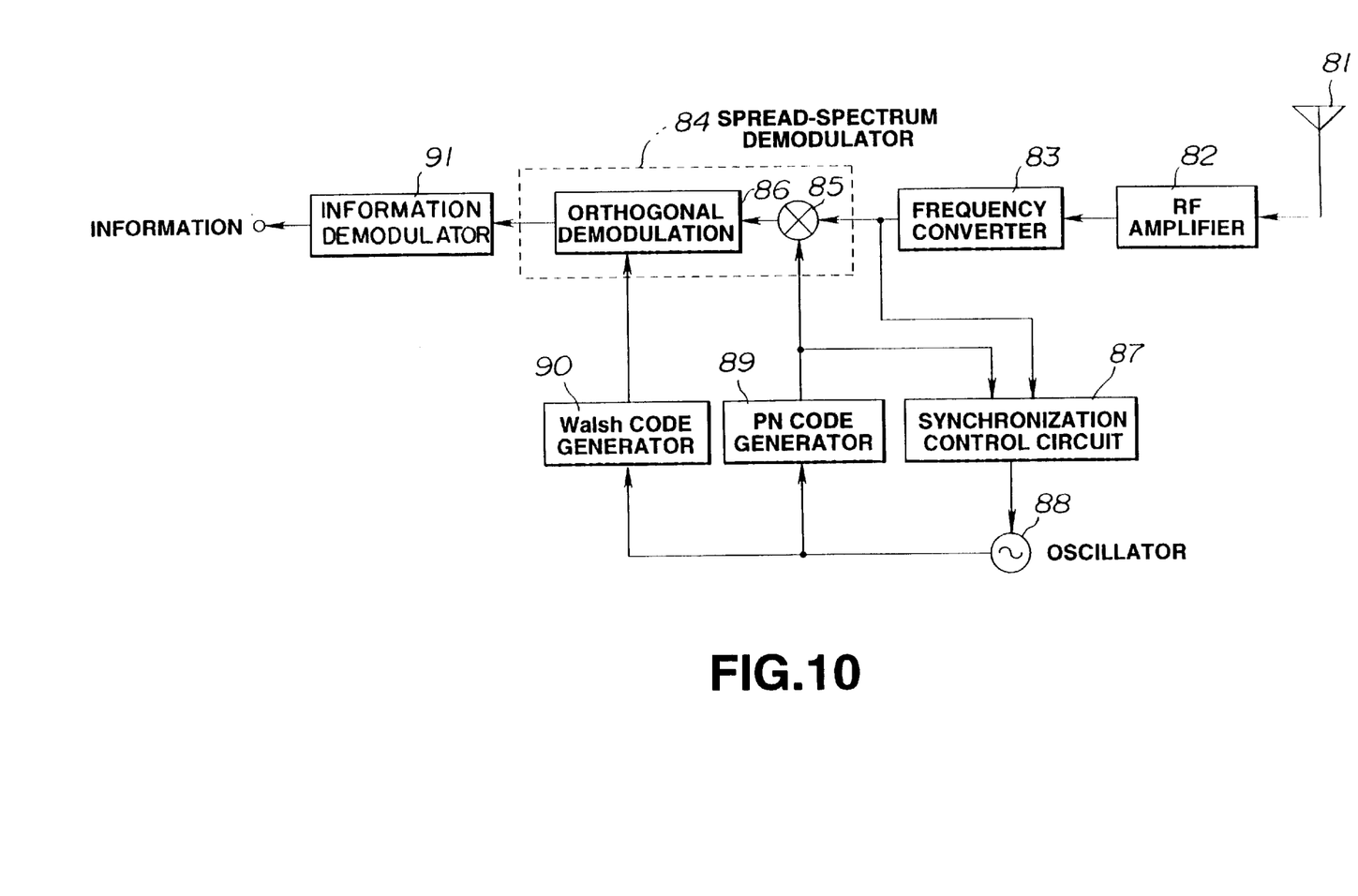
FIG. 10 schematically illustrates another signal receiving apparatus according to the present invention.

The schematic structure of a signal transmission apparatus modified from the apparatus shown in FIG. 7 is shown in FIG. 9, while the schematic structure of a signal reception apparatus for demodulating the transmission signal received from the signal transmission apparatus is shown in FIG. 10.

The analog information signal entering the signal transmission apparatus of FIG. 9, or the digital information signal, grouped in terms of plural bits as units, is sent to an information modulation unit 71, where the input information signal is modulated. For this modulation, if the input signal is an analog signal, it is previously converted into a digital signal.

The modulated information signal is sent to a spread-spectrum modulation unit 72 made up of an orthogonal modulation unit 73 and a multiplier 74. The information signal from the information modulation unit 71 is supplied to the orthogonal modulation unit 73.

The oscillator 75 generates clock signals which are supplied to a Walsh code generator 76 and a PN code generator 77. Thus, from the Walsh code generator 76, the Walsh codes are generated in parallel every $2^m$ bits, based on the clock signals, so as to be supplied to the orthogonal modulator 73. The PN codes of the PN series are generated by the PN code generator 74 in parallel every $2^m$ bits, based on the clock signals, so as to be supplied to the multiplier 74.

In the orthogonal modulation unit 73, the above information signal is orthogonally transformed by the codeword of the Walsh code and modulated. This lowers the error rate of the information signal during demodulation. An output of the orthogonal modulation unit 73 is sent to the multiplier 74, where an output of the orthogonal modulation unit 73 is multiplied with the PN code by way of effecting spectrum spreading (spread-spectrum processing).

An output of the multiplier 74 is sent to a frequency converter 78 where the output of the multiplier 74 is converted into an analog signal and subsequently up-converted to a desired RF frequency. The frequency-converted signal is amplified by a power amplifier 79 and transmitted over a transmission antenna 80.

The signal transmitted from the signal transmitting apparatus of FIG. 9 is received by a reception antenna 81 of FIG. 10. The reception signal is amplified by an RF amplifier 82 and subsequently down-converted by a frequency converter 83 from the RF frequency to the base-band signal. An output signal of the frequency converter 83 is sent to a spread-spectrum demodulator 84, made up of a multiplier 85 and an orthogonal demodulator 86, and to a synchronization control circuit 87.

The synchronization signal of the reception signal is detected by the synchronization control circuit 87 and sent to an oscillator 88. The oscillator generates clock signals based on the detected synchronization signal. These clock signals are sent to a PN code generator 89 and a Walsh code generator 90. Thus the PN code generator 89 generates the PN codes of the PN series in parallel every $2^m$ bits and sends the generated PN codes to the multiplier 85, while the Walsh code generator 90 generates the codeword of the Walsh code in parallel every $2^m$ bits and sends the generated codewords to the orthogonal demodulator 86. The PN codes from the PN code generator 89 are also sent to the synchronization control circuit 87 for synchronization.

The multiplier 85 multiplies the output signal of the frequency converter 83 with the PN code by way of performing inverse spectrum spreading. An output of the multiplier 85 is sent to an orthogonal demodulator 86 where the output of the multiplier 85 is orthogonal transformed by the Walsh codes for demodulation. This assures optimum demodulation with a low error rate. An output of the orthogonal demodulator 86 is sent to an information demodulator 91 for demodulation and outputted as information. If the information is outputted as the analog signal, it may be demodulated by the information demodulator 91 before being converted into analog signals.

I claim:

1. A code generating apparatus comprising:
   counting means for counting clock signals and generating a plurality of output signals;
   control means for generating a control signal from said output signals of said counting means and from upper digit data of a number of a codeword fed thereto; and
   code generating means for generating a code signal from an output signal of said control means and from lower digit data of the number of said codeword fed thereto.

2. The code generating apparatus as claimed in claim 1 wherein said code generating means includes means for generating a Walsh code.

3. The code generating apparatus as claimed in claim 2 wherein the number of said codeword is n digits, said upper digit data of the number of said codeword is m digits, and an output signal of said code generating means is $2^m$ digits.

4. The code generating apparatus as claim in claim 3 wherein said control means comprises a plurality of AND gates for processing an AND operation between respective ones of said plurality of outputs from said counter and said upper digit data of the number of said codeword, and a plurality of EX-OR gates for processing an exclusive OR operation to output signals of said plurality of AND gates.

5. The code generating apparatus as claimed in claim 3 wherein said code generating means comprises a plurality of EX-OR gates for processing an exclusive OR operation to the control signal from said control means and said lower digit data of the number of said codeword.

6. A spread-spectrum transmitter for transmitting a spread-spectrum signal comprising:
   modulating means for modulating an input information signal;
   Walsh coding means for generating a Walsh code based on an output signal of an oscillator, said Walsh code being generated as a series of parallel words; and
   spread-spectrum processing means for generating a spread-spectrum signal for transmission based on an output signal of said Walsh coding means and the modulated input information signal from said modulating means.

7. A spread-spectrum receiver for receiving a spread-spectrum signal comprising:
   spread-spectrum processing means for decoding the received spread-spectrum signal;
   Walsh coding means for generating a Walsh code based on an output signal of an oscillator, said Walsh code being generated as a series of parallel words;
   Walsh decoding means for decoding the output of said spread-spectrum processing means using said Walsh code; and demodulating means for demodulating an output signal of said Walsh decoding means.

8. The spread-spectrum transmitter as claimed in claim 6 wherein said spread-spectrum processing means uses a PN code for processing.

9. The spread-spectrum receiver as claimed in claim 7 wherein said spread-spectrum processing means uses a PN code for processing.

10. The spread spectrum transmitter as claim in claim 6 wherein said Walsh coding means comprises counting means for counting clock signals from the oscillator and generating more than one output signal;

control means for generating a control signal from an output signal of said counting means and upper digit data (n-m digits) of a number of Walsh codeword; and     Walsh code generating means for generating the Walsh code (2 digits) from an output signal of said control means and lower digit data (m digits) of the number of the codeword.

11. The spread-spectrum receiver as claimed in claim 7 wherein said Walsh coding means comprises counting means for counting clock signals and generating a plurality of output signals;

control means for generating a control signal from an output signal of said counting means and upper digit data (n-m digits) of a number of a codeword; and     Walsh code generating means for generating the Walsh code ($2^m$ digits) from an output signal of said control means and lower digit data (m digits) of the number of the codeword.

* * * * *